(12) United States Patent
Reddy

(10) Patent No.: US 7,350,573 B2
(45) Date of Patent: Apr. 1, 2008

(54) SERVICING A WELLBORE WITH WELLBORE FLUIDS COMPRISING PERLITE

(75) Inventor: B. Raghava Reddy, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 294 days.

(21) Appl. No.: 11/053,772

(22) Filed: Feb. 9, 2005

(65) Prior Publication Data

US 2006/0175060 A1 Aug. 10, 2006

(51) Int. Cl.
*E21B 33/13* (2006.01)

(52) U.S. Cl. ...................... 166/285; 166/292

(58) Field of Classification Search ............... 166/285, 166/292
See application file for complete search history.

(56) References Cited

U.S. PATENT DOCUMENTS

| | | | | |
|---|---|---|---|---|
| 4,168,179 A | * | 9/1979 | Hesseler | 106/278 |
| 4,234,344 A | | 11/1980 | Tinsley et al. | 106/88 |
| 4,302,341 A | | 11/1981 | Watson | 252/8.55 R |
| 4,304,298 A | | 12/1981 | Sutton | 166/293 |
| 4,304,300 A | | 12/1981 | Watson | 166/291 |
| 4,340,427 A | | 7/1982 | Sutton | 106/87 |
| 4,367,093 A | | 1/1983 | Burkhalter et al. | 106/87 |
| 4,385,935 A | | 5/1983 | Skjeldal | 106/98 |
| 4,393,939 A | | 7/1983 | Smith et al. | 166/293 |
| 4,450,010 A | | 5/1984 | Burkhalter et al. | 106/87 |
| 4,462,836 A | | 7/1984 | Baker et al. | 106/92 |
| 4,462,837 A | | 7/1984 | Baker et al. | 106/93 |
| 4,559,149 A | | 12/1985 | Shell | 252/8.55 R |
| RE32,742 E | | 9/1988 | Skjeldal | 106/98 |
| 4,957,555 A | * | 9/1990 | Wheeler et al. | 106/716 |
| 5,086,850 A | | 2/1992 | Harris et al. | 175/61 |
| 5,121,795 A | | 6/1992 | Ewert et al. | 166/292 |
| 5,123,487 A | | 6/1992 | Harris et al. | 166/277 |
| 5,125,455 A | | 6/1992 | Harris et al. | 166/292 |
| 5,127,473 A | | 7/1992 | Harris et al. | 166/277 |
| 5,159,980 A | | 11/1992 | Onan et al. | 166/294 |
| 5,207,831 A | | 5/1993 | Cowan | 106/724 |
| 5,226,961 A | | 7/1993 | Nahm et al. | 106/692 |
| 5,238,064 A | | 8/1993 | Dahl et al. | 166/293 |
| 5,263,542 A | | 11/1993 | Brothers et al. | 166/293 |
| 5,293,938 A | * | 3/1994 | Onan et al. | 166/293 |
| 5,294,255 A | * | 3/1994 | Smetana et al. | 106/698 |
| 5,298,070 A | * | 3/1994 | Cowan | 106/724 |

(Continued)

OTHER PUBLICATIONS

Halliburton brochure entitled "MicroBond Expanding Additive for Cement" dated 1999.

(Continued)

*Primary Examiner*—William P Neuder
(74) *Attorney, Agent, or Firm*—Craig W. Roddy; Baker Botts, LLP.

(57) ABSTRACT

Wellbore fluids comprising an expanded and ground perlite and methods of using the same are disclosed. In one embodiment, the methods include a method of cementing comprising preparing or placing a cement composition comprising cement, water, and an expanded and ground perlite. The method further comprises allowing the cement composition to set. A method of servicing a wellbore, comprising providing a wellbore fluid comprising a base fluid and an expanded and ground perlite, placing the wellbore fluid into an annulus in the wellbore, placing a cement composition into the annulus, and allowing the cement composition to set.

20 Claims, 2 Drawing Sheets

U.S. PATENT DOCUMENTS

| | | | |
|---|---|---|---|
| 5,340,397 A | 8/1994 | Brothers | 106/727 |
| 5,398,759 A | 3/1995 | Rodrigues et al. | 166/293 |
| 5,417,759 A | 5/1995 | Huddleston | 106/727 |
| 5,484,019 A | 1/1996 | Griffith et al. | 166/293 |
| 5,588,488 A | 12/1996 | Vijn et al. | 166/293 |
| 5,688,844 A | 11/1997 | Chatterji et al. | 524/8 |
| 5,789,352 A | 8/1998 | Carpenter et al. | 507/209 |
| 5,921,319 A | 7/1999 | Curtice | 166/279 |
| 5,964,934 A * | 10/1999 | Englert | 106/287.1 |
| 6,145,591 A | 11/2000 | Boncan et al. | 166/291 |
| 6,230,804 B1 | 5/2001 | Mueller et al. | 166/293 |
| 6,234,251 B1 | 5/2001 | Chatterji et al. | 166/295 |
| 6,308,777 B2 | 10/2001 | Chatterji et al. | 166/293 |
| 6,330,917 B2 | 12/2001 | Chatterji et al. | 166/295 |
| 6,478,867 B1 | 11/2002 | Cheyrezy et al. | 106/644 |
| 6,508,306 B1 | 1/2003 | Reddy et al. | 166/295 |
| 6,572,697 B2 | 6/2003 | Gleeson et al. | 106/705 |
| 6,593,402 B2 | 7/2003 | Chatterji et al. | 524/7 |
| 6,626,243 B1 | 9/2003 | Boncan | 166/293 |
| 6,645,289 B2 | 11/2003 | Sobolev et al. | 106/705 |
| 6,668,927 B1 | 12/2003 | Chatterji et al. | 166/291 |
| 6,689,208 B1 | 2/2004 | Brothers | 106/794 |
| 6,702,044 B2 | 3/2004 | Reddy et al. | 175/64 |
| 6,723,162 B1 | 4/2004 | Cheyrezy et al. | 106/644 |
| 6,729,405 B2 | 5/2004 | DiLullo et al. | 166/292 |
| 6,823,940 B2 | 11/2004 | Reddy et al. | 166/295 |
| 6,832,651 B2 | 12/2004 | Ravi et al. | 166/292 |
| 6,848,519 B2 | 2/2005 | Reddy et al. | 175/64 |
| 6,852,676 B1 | 2/2005 | Chatterji et al. | 507/202 |
| 2004/0050302 A1 | 3/2004 | Casanova et al. | 106/640 |
| 2004/0206501 A1 | 10/2004 | Brothers et al. | 166/292 |

OTHER PUBLICATIONS

Halliburton brochure entitled "MicroBond HT Cement Additive" dated 1999.
Halliburton brochure entitled "MicroBond M Cement Additive" dated 1999.
Halliburton brochure entitled "Micro Fly Ash Cement Component" dated 1999.
Halliburton brochure entitled "Pozmix® A Cement Additive" dated 1999.
Halliburton brochure entitled "Perlite Cement Additive" dated 1999.
Halliburton brochure entitled "Silicalite Cement Additive" dated 1999.
Halliburton brochure entitled "Spherelite Cement Additive" dated 1999.
Halliburton brochure entitled "Super CBL Additive Cement Additive" dated 1999.

* cited by examiner

SERVICING A WELLBORE WITH WELLBORE FLUIDS COMPRISING PERLITE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates to the field of wellbore fluids and more specifically to the field of using wellbore fluids comprising perlite to service a wellbore.

2. Background of the Invention

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed. One example of a secondary cementing operation is squeeze cementing whereby a cement slurry is employed to plug and seal off undesirable flow passages in the cement sheath and/or the casing.

Cement extender admixtures are typically mixed with the cement to improve the physical properties of the cement. Conventional cement extender admixtures include fumed silica, colloidal silica, flyash, slag, and zeolites. Drawbacks to the conventional cement extender admixtures include a slow rate of ultimate strength development and low tensile and compressive strengths of the resulting cement compositions. Further drawbacks include premature gelation of the cement composition and difficulties with set retardation. Additives such as fibers, elastomers, and latex emulsions have also been developed to improve the physical properties of the cement. Drawbacks to such additives include monetary costs of the additives and a lack of sufficient strength in the resulting composition.

Consequently, there is a need for improved methods of cementing with cement having improved physical properties. Further needs include cement compositions having improved physical properties. Additional needs include improved methods for servicing a wellbore.

BRIEF SUMMARY OF SOME OF THE PREFERRED EMBODIMENTS

These and other needs in the art are addressed in one embodiment by a method of cementing. The method comprises preparing or placing a cement composition comprising cement, water, and an expanded and ground perlite. The method further comprises allowing the cement composition to set.

In another embodiment, needs in the art are addressed by a method of servicing a wellbore. The method includes providing a wellbore fluid comprising a base fluid and an expanded and ground perlite and placing the wellbore fluid to an annulus. In addition, the method comprises placing a cement composition into the annulus, and allowing the cement composition to set.

Servicing a wellbore with a wellbore fluid having expanded and ground perlite overcomes problems in the art such as using cement compositions with insufficient physical properties. For instance, conducting cement operations with cement having expanded and ground perlite provides a cement composition having improved physical properties and thereby provides an improved cement operation.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
FIG. 1 illustrates an SEM micrograph of an unexpanded and ground perlite.

In an embodiment, a wellbore fluid comprises expanded and ground perlite. The perlite is expanded and ground before being mixed into the wellbore fluid. Without being limited by theory, it is believed that the expanded and ground perlite improves mechanical properties of the wellbore fluid. In an embodiment, the wellbore fluid is a cement composition comprising cement, water, and the expanded and ground perlite.

The wellbore fluids are suitable for subterranean applications such as well completion and remedial operations. It is to be understood that "subterranean applications" encompass both areas below exposed earth and areas below earth covered by water such as ocean or fresh water.

In an embodiment in which the wellbore fluid is a cement composition, the cement composition comprises a cement such as hydraulic cement, which includes calcium, aluminum, silicon, oxygen, and/or sulfur and which sets and hardens by reaction with water. Examples of hydraulic cements include but are not limited to Portland cements (e.g., classes A, C, G, and H Portland cements), pozzolana cements, gypsum cements, phosphate cements, high alumina content cements, silica cements, high alkalinity cements, and combinations thereof.

In some embodiments, the cement compositions include a sufficient amount of water to form a pumpable cementitious slurry. The water may be fresh water or salt water, e.g., an unsaturated aqueous salt solution or a saturated aqueous salt solution such as brine or seawater, or a non-aqueous fluid. The water may be present in the amount from about 20 to about 180 percent by weight of cement, alternatively from about 28 to about 60 percent by weight of cement. The cement compositions may comprise a density from about 4 lb/gallon to about 23 lb/gallon. In alternative embodiments, the cement compositions may comprise a density from about 12 lb/gallon to about 17 lb/gallon. In other alternative embodiments, the cement compositions may be low-density cement compositions with a density from about 6 lb/gallon to about 14 lb/gallon.

The cement compositions comprise a sufficient amount of the expanded and ground perlite to provide a cement composition having improved mechanical properties. In an embodiment, the perlite may be present in the cement composition in an amount from about 1 to about 100 percent by weight of the cement, alternatively in an amount from about 5 to about 60 percent by weight of the cement, and alternatively from about 10 to about 30 percent by weight of the cement.

Perlite is an ore and refers to a naturally occurring volcanic, amorphous siliceous rock comprising mostly silica and alumina. Perlite ore typically contains 2 to 6 percent combined water. A characteristic of perlite ore is that it may expand to form a cellular high porosity particle or hollow sphere containing multi-cellular cores when exposed to high temperatures due to the sudden vaporization of water. In some instances, the perlite ore may expand from about 4 to about 20 times its original volume with the resulting particle sizes varying between 500 and 2,000 microns. The expanded perlite has a very high porosity capable of absorbing many times its weight of aqueous or non-aqueous fluids and still remains dry.

The perlite ore is expanded and ground prior to being mixed with the cement composition and placed in a wellbore. The perlite can be ground to any size suitable for use in cementing operations. In an embodiment, the perlite is ground to a mean particle size from about 2 to about 400 microns, alternatively from about 5 to about 250 microns, and alternatively from about 10 to about 120 microns. The mean particle size corresponds to d50 values as measured by commercially available particle size analyzers such as those manufactured by Malvern Instruments, Worcestershire, United Kingdom. The particle sizes may also be quantified by sieve analysis. By sieve analysis, the perlite is ground to a size by which about 30 to about 100% of the particles pass through a 325 mesh screen.

Figure 2:
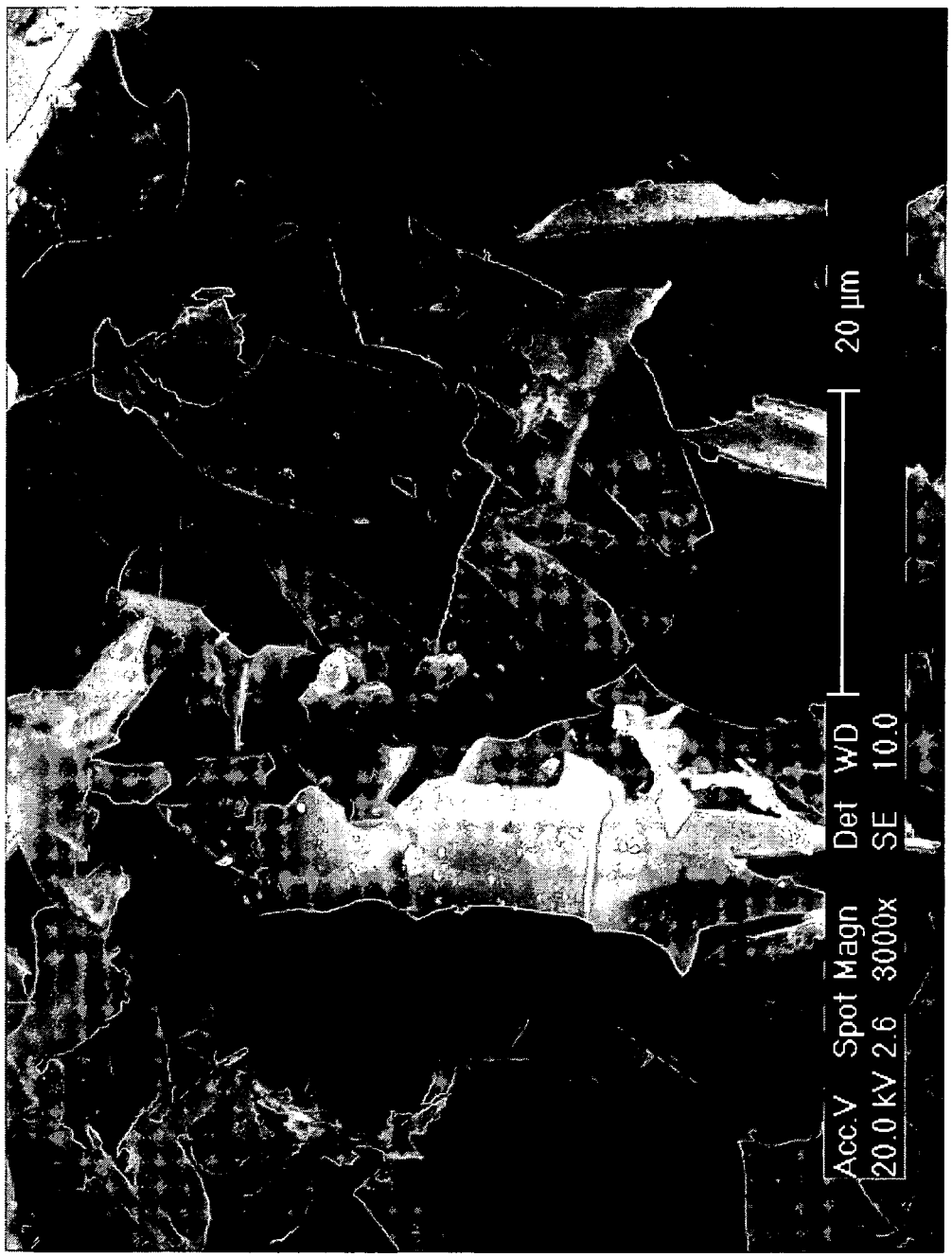
FIG. 2 illustrates an SEM micrograph of an expanded and ground perlite.

The expanded and ground perlite particles may have jagged edges. For example, FIG. 1 illustrates an SEM micrograph of unexpanded and ground perlite, and FIG. 2 illustrates an SEM micrograph of expanded and ground perlite. Without being bound by theory, the jagged edges of the expanded and ground perlite may interlock when at close proximity to each other, which may provide for the increase in mechanical properties of the cement compositions having the expanded and ground perlite. In an embodiment, the expanded and ground perlite is a non-spherical, particulate material. The perlite can be ground by any method suitable for providing a ground perlite of a desired size.

The perlite may be expanded by any suitable method. Without limitation, an example of a suitable method for expanding perlite includes contacting the perlite with hot gases of a sufficient temperature to cause the perlite to expand (e.g., gases above about 1,600° F.). In some instances, the velocity of the hot gases is sufficient to separate the expanded perlite from non-expanded perlite.

It is to be understood that the expanded and ground perlite is not limited to being prepared in any particular order of grinding and expansion. Instead, the expanded and ground perlite may be prepared in any order of grinding and expansion suitable for providing an expanded and ground perlite of the desired size. For instance, in an embodiment, the perlite is expanded, and the expanded perlite is then ground to the desired size. In another embodiment, the perlite is ground to a first size, expanded to provide expanded perlite, and then further ground to a second size that is suitable for use in cementing operations. An alternative embodiment includes grinding perlite to a desired size and then expanding the ground perlite to provide an expanded and ground perlite of the desired size. Examples of suitable commercially available expanded and ground perlites include HARBORLITE brand products, for example HARBORLITE 205, available from World Minerals Inc. of Santa Barbara, Calif., and ultrafine filler grade perlite available from The Schundler Company, Metuchen, N.J. It is to be further understood that the expanded and ground perlite may be added to the cement compositions in any suitable way. For instance, the expanded and ground perlite may be added to mix water as dry powder, an aqueous suspension, or a non-aqueous suspension; or the expanded and ground perlite may be dry blended with the cement composition prior to mixing the blend with the mix water.

Mechanical properties of the cement composition that may be improved by the expanded and ground perlite include without limitation compressive strength, tensile strength, Poisson's ratio, the number of cycles from a cyclic compression test, and Young's modulus (YM). For example, the compressive and tensile strengths of cement compositions containing perlite may increase from about 5 to about 100% in comparison to similar compositions containing fumed silica or pozzalanic materials such as Class F flyash. Without being limited by theory, improvement of tensile and compressive strengths with the accompanying changes to Poisson's Ratio and Young's modulus can improve the ability of cement compositions to resist, without failing, cyclic changes in pressures and temperatures due to a variety of well operations during the lifetime of the well.

In an embodiment, the cement composition comprising expanded and ground perlite is a low-density cement composition. Low-density cement compositions refer to cement compositions with a density from about 6 pounds per gallon to about 14 pounds per gallon. An embodiment includes the low-density cement composition comprising expanded and ground perlite further comprising a low specific gravity material. A low specific gravity material refers to a material having a specific gravity lower than cement. Without limitation, examples of such low specific gravity materials include fumed silica, diatomaceous earth, pozzalanic materials such as flyashes, and clays such as bentonite and kaolin. Without being limited by theory, expanded and ground perlite may decrease slurry density but also increase the tensile and compressive strengths with the result that Poisson's ratio and Young's modulus values may also be increased.

In some embodiments, the low-density cement compositions are foamed cement compositions or include density reducing additives. For a foamed cement composition, an embodiment may include the foamed cement composition comprising foaming agents, foam stabilizing agents, and combinations thereof, which may be included in the cement composition to facilitate the foaming and/or enhance the stability of the cement composition. Such foaming and/or foam stabilizing agents may be present in the cement composition in an amount sufficient to provide a stable, foamed cement composition. It is to be understood that one of ordinary skill in the art would be able to select the proper foaming and/or foam stabilizing agents as well as the amounts of such agents according to the particular application. Addition of expanded and ground perlite to such foamed cement compositions also provides for additional decrease in slurry density as well as for improved mechanical properties of foamed cement compositions.

In an embodiment, a low-density cement composition includes density reducing additives. Without limitation, examples of density reducing additives include hollow glass beads, microspheres, and combinations thereof. The density reducing additives may include any microspheres that are compatible with a subterranean cement composition (e.g., that are chemically stable at least until the cement sets). An example of a suitable microsphere is commercially available from Halliburton Energy Services, Inc. as SPHERELITE. The low-density cement composition may include the microspheres in an amount sufficient to provide a cement composition having a density in a desired range. In an embodiment, the microspheres may be present in the cement composition in an amount from about 10 to about 150 percent by weight of the cement. The microspheres may be added to the cement composition by any suitable method including dry blending with the cement before the addition of a fluid such as water, mixing with the fluid to be added to the cement, or by mixing with the cement slurry consecutively with or after the addition of the fluid. In another embodiment, the microspheres may be pre-suspended in water and injected into the cement mix fluid or into the cement slurry as an aqueous slurry.

In an embodiment, the foamed cement composition may include an expanding additive. The expanding additive may be any component that enables a gas to become incorporated into the cement composition. Without limitation, examples of suitable expanding additives in particulate form include aluminum powder, gypsum blends, deadburned magnesium oxide, and combinations thereof. Examples of expanding additives comprising aluminum powder that are commercially available include GAS-CHEK and SUPER CBL from Halliburton Energy Services, Inc. An example of an expanding additive comprising a blend containing gypsum is commercially available as MICROBOND from Halliburton Energy Services, Inc. In addition, examples of expanding additives comprising deadburned magnesium oxide are commercially available as MICROBOND M and MICROBOND HT from Halliburton Energy Services, Inc. Such expanding additives are described in U.S. Pat. Nos. 4,304,298; 4,340,427; 4,367,093; 4,450,010 and 4,565,578, which are incorporated herein by reference in their entirety. The cement composition may contain an amount of the expanding additive from about 2 to about 18 wt. %, alternatively from about 5 to about 10 wt. %.

The addition of an expanding additive to the cement composition may be accomplished by any suitable method. In one embodiment, the cement composition is foamed by direct injection of an expanding additive into the cement composition. For instance, where the cement composition is foamed by the direct injection of gas into the cement composition, the gas utilized may be air, an inert gas such as nitrogen, and combinations thereof. In other embodiments, the cement composition is foamed by gas generated from a reaction between the cement composition and an expanding additive present in the cement composition in particulate form. For example, the cement composition may be foamed by hydrogen gas generated in situ as the product of a reaction between high pH slurry and fine aluminum powder present in the cement.

In some embodiments, additional additives may be added to the cement composition for improving or changing the properties thereof. Examples of such additives include but are not limited to salts, accelerants, set retarders, defoamers, fluid loss reducing agents, settling prevention agents, gas migration prevention additives, weighting materials, dispersants, vitrified shale, formation conditioning agents, and combinations thereof. Other mechanical property modifying additives, for example, carbon fibers, glass fibers, metal fibers, minerals fibers, thermoplastic elastomers such as styrene butadiene or acrylonitrile-styrene-butadiene random or block polymers, and latex emulsions, for example styrene-butadiene latexes, and the like can be added to further modify the mechanical properties.

It is to be understood that the wellbore fluid comprising expanded and ground perlite is not limited to cement compositions but may also include spacer fluids. In an alternative embodiment, the wellbore fluid is a spacer fluid comprising expanded and ground perlite and a base fluid. Without being limited by theory, spacer fluids comprising expanded and ground perlite have improved rheological properties. Without being limited by theory, the spacer fluids comprising expanded and ground perlite are shear thinning and therefore allow for lower pump pressures. In addition, with higher rheology at low shear values, such spacer fluids allow for efficient particle suspension ability of the spacer fluids. Spacer fluids and their typical compositions are disclosed in U.S. Pat. No. 5,789,352, which is incorporated herein by reference in its entirety.

In an embodiment, the expanded and ground perlite may be present in the spacer fluid in an amount from about 5 to about 50% by weight of the spacer fluid, alternatively in an amount from about 10 to about 25% by weight of the spacer fluid. The expanded and ground perlite may be added to the spacer fluid in a variety of ways and mixed in any order. The expanded and ground perlite may be added to mix water as dry powder, an aqueous suspension, or a non-aqueous suspension; or the expanded and ground perlite may be dry blended with the other spacer solids prior to mixing the blend with the mix water.

The spacer fluid may be any fluid suitable for being placed between two fluids contained or to be pumped within a wellbore. For example, the spacer fluid may be placed between hydraulic cement slurries and drilling fluids, between drilling fluids, and the like. For example, a hydraulic cement slurry and drilling fluid are separated by a spacer fluid when the cement slurry is placed in the annulus between a pipe string and the walls of a wellbore.

The base fluid may comprise an aqueous-based fluid or a nonaqueous-based fluid. Examples of suitable aqueous-based fluids include without limitation fresh water, salt water (e.g., water containing one or more salts dissolved therein), brine (e.g., saturated salt water), or seawater. Examples of suitable nonaqueous-based fluids include without limitation diesel, crude oil, kerosene, aromatic and nonaromatic mineral oils, olefins, and various other carriers and blends of any of the preceding examples such as paraffin, waxes, esters, and the like. The spacer fluid may comprise from about 20 to about 99 percent by volume of the base fluid.

The foregoing cement compositions comprising expanded and ground perlite may be used in various cementing operations wherein the cement is prepared, placed into a workspace, and allowed to set. In an embodiment, the cement compositions are used in various surface applications to cement a workspace at or above the ground, for example, a workspace encountered in the construction industry. In another embodiment, the cement is used in a subterranean workspace, for example in cementing underground pipe such as sewer pipe or wellbore casing. In one embodiment, the cement compositions may be employed in primary cementing of a wellbore for the recovery of natural resources such as water or hydrocarbons. Primary cementing first involves drilling a wellbore to a desired depth such that the wellbore penetrates a subterranean formation while circulating a drilling fluid through the wellbore. Subsequent to drilling the wellbore, at least one conduit such as a casing may be placed in the wellbore while leaving a space known as the annulus between the wall of the conduit and the wall of the wellbore. The drilling fluid may then be placed down through the conduit and up through the annulus one or more times, for example, twice, to clean out the hole. The cement composition may then be conveyed downhole and up through the annulus, thereby displacing the drilling fluid from the wellbore. The cement composition sets into a hard mass, which forms a cement column that isolates an adjacent portion of the subterranean formation and provides support to the adjacent conduit.

In another embodiment, the cement composition may be employed in a secondary cementing operation such as squeeze cementing, which is performed after the primary cementing operation. In squeeze cementing, the cement composition is forced under pressure into permeable zones through which fluid can undesirably migrate in the wellbore. Examples of such permeable zones include fissures, cracks, fractures, streaks, flow channels, voids, high permeability streaks, annular voids, or combinations thereof. The permeable zones may be present in the cement column residing in the annulus, a wall of the conduit in the wellbore, a microannulus between the cement column and the subterranean formation, and/or a microannulus between the cement column and the conduit. The cement composition sets within the permeable zones, thereby forming a hard mass to plug those zones and prevent fluid from leaking therethrough.

In one embodiment, the wellbore fluid is a spacer fluid comprising expanded and ground perlite. The spacer fluid may be placed in an annulus of a wellbore in any suitable manner. In an embodiment, the spacer fluid may be placed into the annulus directly from the surface. In another embodiment, the spacer fluid may be placed into the annulus by flowing through the casing into place in the annulus between the casing and the subterranean formation. Additional fluids such as cements may be circulated into place behind the spacer fluids.

To further illustrate various illustrative embodiments of the present invention, the following examples are provided.

EXAMPLE 1

Two perlite samples, HARBORLITE M2B and HARBORLITE 205, were obtained from World Minerals Inc. of Santa Barbara, Calif. HARBORLITE M2B was unexpanded and ground perlite, and HARBORLITE 205 was expanded and ground perlite. The HARBORLITE M2B and HARBORLITE 205 particles were analyzed for particle size distribution by particle size analyzer (Model MS S 14), which was manufactured by Malvern Instruments Limited, Worcestershire, U.K. The mean particle size was 3.2 microns for the HARBORLITE M2B material, and 17.9 microns for the HARBORLITE 205 material. In addition, 90% of the HARBORLITE M2B material was below 7.6 microns, and 90% of the HARBORLITE 205 material was below 51.9 microns. 99.98% of the particles of the HARBORLITE M2B material passed through a 325 mesh screen, and 85.3% of the particles of the HARBORLITE 205 material passed through a 325 mesh screen.

EXAMPLE 2

A variety of sample cement compositions were prepared in the following example.

Composition 1 was prepared according to API Recommended Practice 10B, Twenty-Second Edition, December 1997, by mixing 56% Class H cement bwoc, 22% POZMIX A bwoc, 22% fumed silica bwoc (available as SILICALITE from Halliburton Energy Services, Inc.), and 2% bwoc bentonite. POZMIX A refers to cement commercially available from Halliburton Energy Services, Inc. This mixture was added to 112.6% bwoc water and 0.125 gallons of D-AIR 3000 L per sack of Class H cement to obtain a slurry with a density of 12.0 pounds per gallon (ppg). D-AIR 3000 L refers to a defoamer commercially available from Halliburton Energy Services, Inc. The slurry was poured into molds for compressive strength and tensile strength measurements and cured for 72 hrs at 190° F. under a pressure of 3,000 psi in an autoclave. Preparation of samples and measurement of compressive strengths was done according to API Recommended Practice 10B. The Tensile Strength Test was performed by using dog-bone-shaped briquettes according to the procedure described for test CRD-C 260-01 in the U.S. Army Corps of Engineers' Handbook for Concrete and Cement.

Composition 2 was prepared similar to Composition 1 except that SILICALITE was replaced with the same amount of expanded and ground perlite (HARBORLITE 205), and the water was adjusted to obtain a 12.0 ppg slurry. The properties of the composition are listed in Table I. The results show that the tensile strengths increased significantly when expanded and ground perlite was used instead of fumed silica.

COMPARATIVE EXAMPLE 2

A cement composition similar to Composition 2 was prepared with the exception that ground, unexpanded perlite, HARBORLITE M2B, was used instead of expanded and ground perlite. The results show that an increase in tensile strength was not as high as that observed for expanded and ground perlite. The results are shown in Table I.

TABLE I

|  | Comp. 1 | Comp. 2 | COMPARATIVE EXAMPLE 2 |
| --- | --- | --- | --- |
| Cmt #1, % | 56 | 56 | 56 |
| SILICALITE | 22 |  |  |
| Class F Flyash | 22 | 22 | 22 |
| Ground Perlite |  |  | 22 |
| Ground Expanded Perlite |  | 22 |  |
| Water | 111 | 110 | 110 |
| Carbon Fibers, % bwoc |  |  |  |
| Compressive Strength, psi | 1210 | 1160 | 1070 |
| Tensile Strength, psi | 90 | 150 | 120 |

EXAMPLE 3

Composition 3 was similar to Composition 1 except that additional carbon fibers available from Halliburton Energy Services, Inc. as FDP C684 at 1% bwoc and glass fibers available from Halliburton Energy Services, Inc. as FDP C734 at 1% bwoc were added, and the water amount was adjusted to obtain a 12 ppg slurry. The compressive and tensile strengths were measured as described in Example 2. Additionally, cement samples for measurement of mechanical properties were prepared by curing the cement slurry in 2'×5" metal alloy cylinders under a pressure of 3,000 psi at 190° F. for 72 hrs. The cylindrical samples were removed, cut, and polished to obtain 2"×4" cylinders. The load vs displacement measurements were performed on MTS Load Frame equipment manufactured by Eden Prairie, Minn. Uni-axial and tri-axial stress-strain tests were performed on cylindrical samples to determine Young's modulus, Poisson's ratio (PR), and Friction angles. Tests were performed as prescribed in ASTM D 3148-02 (Standard Test Method for Elastic Moduli of Intact Rock Core Specimens in Uniaxial Compression) and D 2664-95a (Standard Test Method for Triaxial Compressive Strength of Undrained Rock Core Specimens without Pore Pressure Measurements). Dual axial extensometers and a circumferential chain extensometer were used to measure strains on samples. Poisson's ratio refers to the ratio of transverse contraction strain to longitudinal strain in the direction of stretching force and is represented by the following equation:

$$\nu = \epsilon_{transverse} / \epsilon_{longitudinal}$$

wherein $\nu$ represents Poisson's ratio and $\epsilon$ represents strain as defined by the change in length divided by the original length. The properties are shown in Table II.

Composition 4 was similar to Composition 2 except that additional carbon fibers (FDP C684 at 1% bwoc) and glass fibers (FDP C734 at 1% bwoc) were added, and the water amount was adjusted to obtain a 12 ppg slurry. The mechanical properties are presented in Table II. The results again confirm that replacement of fumed silica by expanded and ground perlite improved the strength of the formulation significantly. For example the compressive strengths increased approximately by 30%, and tensile strengths increased by about 70%.

Composition 5 was similar to Composition 3 except that the glass fiber content was increased to 2% bwoc. Composition 6 was similar to Composition 4 except that the glass fiber content was increased to 2% bwoc. Again, the tensile and compressive strengths were higher for compositions containing expanded and ground perlite when compared to the compositions containing fumed silica. In parallel with an increase in tensile and compressive strengths, the Young's modulus also increased for compositions containing expanded and ground perlite, which indicated increased strengths of the composition.

Composition 7 was prepared by mixing Portland cement of specific gravity 2.820 with fumed silica at 20% bwoc, and 2% bwoc glass fibers, FDP C734, in sufficient water to yield a 12.0 ppg slurry. Composition 8 was similar to Composition 7 except that fumed silica was replaced by expanded and ground perlite, HARBORLITE 205, and the amount of water was adjusted to obtain a 12.0 ppg slurry. The mechanical properties are presented in Table II. A comparison of mechanical properties of Composition 7 and Composition 8 show that the compressive strengths and tensile strengths are increased when expanded and ground perlite is used. The Young's modulus also increased as expected for increased strengths. The Poisson's Ratio value also increased, which may be indicative of decreased porosity of the composition containing expanded and ground perlite.

TABLE II

|  | Comp. 3 | Comp. 4 | Comp. 5 | Comp. 6 | Comp. 7 | Comp. 8 |
| --- | --- | --- | --- | --- | --- | --- |
| Cmt #1, % | 56 | 56 | 56 | 56 |  |  |
| Cmt #2, % |  |  |  |  | 100 | 100 |
| Silicalite | 22 |  | 22 |  | 20 |  |
| Class F Flyash | 22 | 22 | 22 | 22 |  |  |
| Ground Expanded Perlite |  | 22 |  | 22 |  | 20 |
| Carbon Microfibers | 1 | 1 | 1 | 1 |  |  |
| Glass Fibers | 1 | 1 | 2 | 2 | 2 | 2 |
| water | 115 | 110 | 116 | 111 | 132 | 128 |
| Compressive Strength, psi | 1040 | 1500 | 1570 | 1950 | 2060 | 3320 |
| Tensile Strength, psi | 130 | 260 | 170 | 240 | 195 | 210 |
| YM (xE+5) | 5.06 | 5.5 |  |  | 5.92 | 8.71 |
| PR | 0.222 | 0.177 |  |  | 0.267 | 0.302 |

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore, comprising:
providing a spacer fluid comprising a base fluid and an expanded and ground perlite, wherein the expanded and ground perlite was expanded prior to being ground;
placing the spacer fluid into an annulus in the wellbore;
placing a cement composition into the annulus to displace the spacer fluid that has been placed into the annulus; and
allowing the cement composition to set.

2. The method of claim 1, wherein the expanded and ground perlite is present in the wellbore fluid in an amount from about 5 to about 50 percent by weight of the wellbore fluid.

3. The method of claim 1, wherein the base fluid comprises an aqueous-based fluid or a non-aqueous based fluid.

4. The method of claim 1, comprising expanding perlite ore to provide an expanded perlite and grinding the expanded perlite to a reduced size to provide the expanded and ground perlite.

5. The method of claim 1, wherein the expanded and ground perlite is prepared from a perlite ore by grinding the perlite ore to a perlite having a first size, further wherein the perlite having the first size is expanded to provide an expanded perlite, and further wherein the expanded perlite is ground to a second size to provide the expanded and ground perlite.

6. The method of claim 1, comprising grinding perlite ore to provide a ground perlite, expanding the ground perlite to provide an expanded perlite, and grinding the expanded perlite to provide the expanded and ground perlite.

7. The method of claim 1, wherein the expanded and ground perlite has a mean particle size from about 2 microns to about 400 microns.

8. The method of claim 1, wherein the expanded and ground perlite has a mean particle size from about 5 microns to about 250 microns.

9. The method of claim 1, wherein the expanded and ground perlite has a mean particle size from about 10 microns to about 120 microns.

10. The method of claim 1, wherein the expanded and ground perlite comprises particles, and further wherein the expanded and ground perlite has a particle size wherein about 30 to about 100% of the particles pass through a 325 mesh screen.

11. The method of claim 1, wherein the expanded and ground perlite is present in the spacer fluid in an amount of about 10% to about 25% by weight of the spacer fluid.

12. The method of claim 1, wherein a drilling fluid is present in the annulus in the well bore prior to placing the spacer fluid in the annulus in the well bore.

13. A method of servicing a wellbore, comprising:
circulating a drilling fluid in an annulus in the well bore;
providing a spacer fluid comprising a base fluid and an expanded and ground perlite, wherein the expanded and ground perlite was expanded prior to being ground;
placing the spacer fluid into the annulus in the wellbore;
placing a cement composition into the annulus to displace the spacer fluid that has been placed into the annulus; and
allowing the cement composition to set.

14. The method of claim 13, wherein the expanded and ground perlite is present in the wellbore fluid in an amount from about 5 to about 50 percent by weight of the wellbore fluid.

15. The method of claim 13, wherein the base fluid comprises an aqueous-based fluid.

16. The method of claim 13, wherein the expanded and ground perlite is prepared from a perlite ore by grinding the perlite ore; expanding the ground perlite ore; and grinding the ground and expanded perlite ore to provide the expanded and ground perlite.

17. The method of claim 13, wherein the expanded and ground perlite has a mean particle size from about 2 microns to about 400 microns.

18. The method of claim 13, wherein the expanded and ground perlite has a mean particle size from about 10 microns to about 120 microns.

19. The method of claim 13, wherein the expanded and ground perlite is present in the spacer fluid in an amount of about 10% to about 25% by weight of the spacer fluid.

20. A method of servicing a wellbore, comprising:
providing a spacer fluid comprising a base fluid and an expanded and ground perlite, wherein the expanded and ground perlite was expanded prior to being ground, wherein the expanded and ground perlite is present in the spacer fluid in an amount of about 10% to about 25% by weight of the spacer fluid, wherein the expanded and ground perlite has a mean particle size from about 10 microns to about 120 microns;
placing the spacer fluid into an annulus in the wellbore;
placing a cement composition into the annulus to displace the spacer fluid that has been placed into the annulus; and
allowing the cement composition to set.

* * * * *